United States Patent
Keithley et al.

(10) Patent No.: US 9,100,610 B2
(45) Date of Patent: Aug. 4, 2015

(54) METHOD AND SYSTEM FOR PERFORMING IMAGE PROCESSING ON A DOCUMENT BASED ON A DELAYED DETERMINATION OF WHETHER THE DOCUMENT IS MONOCHROME OR COLOR

(71) Applicant: Marvell World Trade Ltd., St. Michael (BB)

(72) Inventors: Douglas Gene Keithley, Boise, ID (US); David K. Poole, Boise, ID (US); Jay R. Shoen, Boise, ID (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 14/157,315

(22) Filed: Jan. 16, 2014

(65) Prior Publication Data

US 2014/0198351 A1    Jul. 17, 2014

Related U.S. Application Data

(60) Provisional application No. 61/753,559, filed on Jan. 17, 2013.

(51) Int. Cl.
*H04N 1/04* (2006.01)
*H04N 1/40* (2006.01)

(52) U.S. Cl.
CPC ....... *H04N 1/40012* (2013.01); *H04N 1/40062* (2013.01)

(58) Field of Classification Search
CPC . H04N 19/132; H04N 19/182; H04N 19/186; H04N 19/50; H04N 1/56; H04N 1/64; H04N 2201/3259

USPC .......... 358/474, 471, 400, 518, 1.9; 382/312, 382/167, 266

See application file for complete search history.

(56) References Cited

U.S. PATENT DOCUMENTS

| | | | |
|---|---|---|---|
| 2008/0273746 A1* | 11/2008 | Minamino | 382/100 |
| 2009/0034005 A1 | 2/2009 | Gotoh | |
| 2011/0081076 A1* | 4/2011 | Sakaue | 382/165 |

OTHER PUBLICATIONS

The PCT Search Report and Written Opinion mailed Apr. 10, 2014 for PCT application No. PCT/US14/11983, 9 pages.

* cited by examiner

*Primary Examiner* — Martin Mushambo

(57) ABSTRACT

Embodiments include systems and methods for performing image processing on a document based on a delayed determination of whether the document is monochrome or color. The image reproduction system includes image processing hardware configured to receive a plurality of pixels corresponding to a scan document, perform color processing on the plurality of pixels to produce color-processed scan data, perform monochrome processing on the plurality of pixels to produce monochrome-processed scan data, produce color distribution data for the plurality of pixels, and determine from the color distribution data that the scan document is one of a color document or a monochrome document. Based at least on determining that the scan document is one of a color document or a monochrome document, one of the color-processed scan data or the monochrome-processed scan data are discarded.

20 Claims, 8 Drawing Sheets

METHOD AND SYSTEM FOR PERFORMING IMAGE PROCESSING ON A DOCUMENT BASED ON A DELAYED DETERMINATION OF WHETHER THE DOCUMENT IS MONOCHROME OR COLOR

CROSS REFERENCE TO RELATED APPLICATIONS

The present disclosure claims priority to U.S. Patent Application No. 61/753,559, filed Jan. 17, 2013, which is incorporated herein by reference in its entirety.

TECHNICAL FIELD

Embodiments of the present disclosure relate to image processing, and in particular to techniques for performing image processing on a document based on a delayed determination of whether the document is monochrome or color.

BACKGROUND

A conventional color scan utilizes three channels, one each for red, green, and blue (i.e., RGB channels). Monochrome image processing utilizes only one channel, and involves different processing and tuning than color image processing. Conventional copiers and scanners therefore operate in either monochrome mode or color mode. Some devices include a color button and a monochrome button—or other mechanisms such as control panel menu items—that are selectable to process an image as either a color or a monochrome document. This requires the user to select the imaging mode. Monochrome image processing uses approximately one third of the memory resources, and can be done three times faster, than color image processing. Generally speaking, image quality is better when the image processing mode matches the original document type. A monochrome document is best processed in monochrome and a color document is best processed in color. However, many users tend to choose color image processing for all documents even though quality would be better, and fewer resources would be used, if monochrome image processing were used for monochrome documents.

SUMMARY

In various embodiments, the present disclosure provides an image reproduction system that includes image processing hardware configured to receive a plurality of pixels corresponding to a scan document, perform color processing on the plurality of pixels to produce color-processed scan data, perform monochrome processing on the plurality of pixels to produce monochrome-processed scan data, produce color distribution data for the plurality of pixels, and determine from the color distribution data that the scan document is one of a color document or a monochrome document. Based at least on determining that the scan document is one of a color document or a monochrome document, the system discards one of the color-processed scan data or the monochrome-processed scan data.

In various embodiments, the present disclosure provides a method of automatically selecting a scan mode for a scanned document. The method comprises receiving color pixel data of the scanned document, producing color distribution data from the color pixel data, color processing the color pixel data to produce color output data, monochrome processing the color pixel data to produce monochrome output data, and determining, subsequent to the color processing and the monochrome processing that the scanned document is one of a monochrome document or a color document. The determining is based at least on the color distribution data. Responsive to the determining, the method passes one of the color output data or the monochrome output data to downstream processing.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Various embodiments are illustrated by way of example and not by way of limitation in the figures of the accompanying drawings.

DETAILED DESCRIPTION OF EMBODIMENTS OF THE INVENTION

The present specification describes scanner and copier systems, as well as methods, for determining a processing mode for a scanned document based on determining whether the original document is monochrome or color. As noted above, reproduction is generally better when monochrome processing is performed on a monochrome document. According to embodiments of the present disclosure, a scanned document is initially processed in both color and monochrome. An image processing hardware determines whether the document is a color or monochrome document, such as based on color statistics produced during color processing. Scan data associated with the color processing are retained upon determining that the original document includes color. Scan data associated with the monochrome processing are retained upon determining that the original document is monochrome. The retained data is then passed on for further processing steps. The image processing hardware may be, or may be part of, among other things scanners, copiers, digital cameras (including cameras embedded within mobile phones), fax machines, or any device that captures raw image data from a document and outputs either a printed copy of the document or stores an image of the document.

Figure 1:
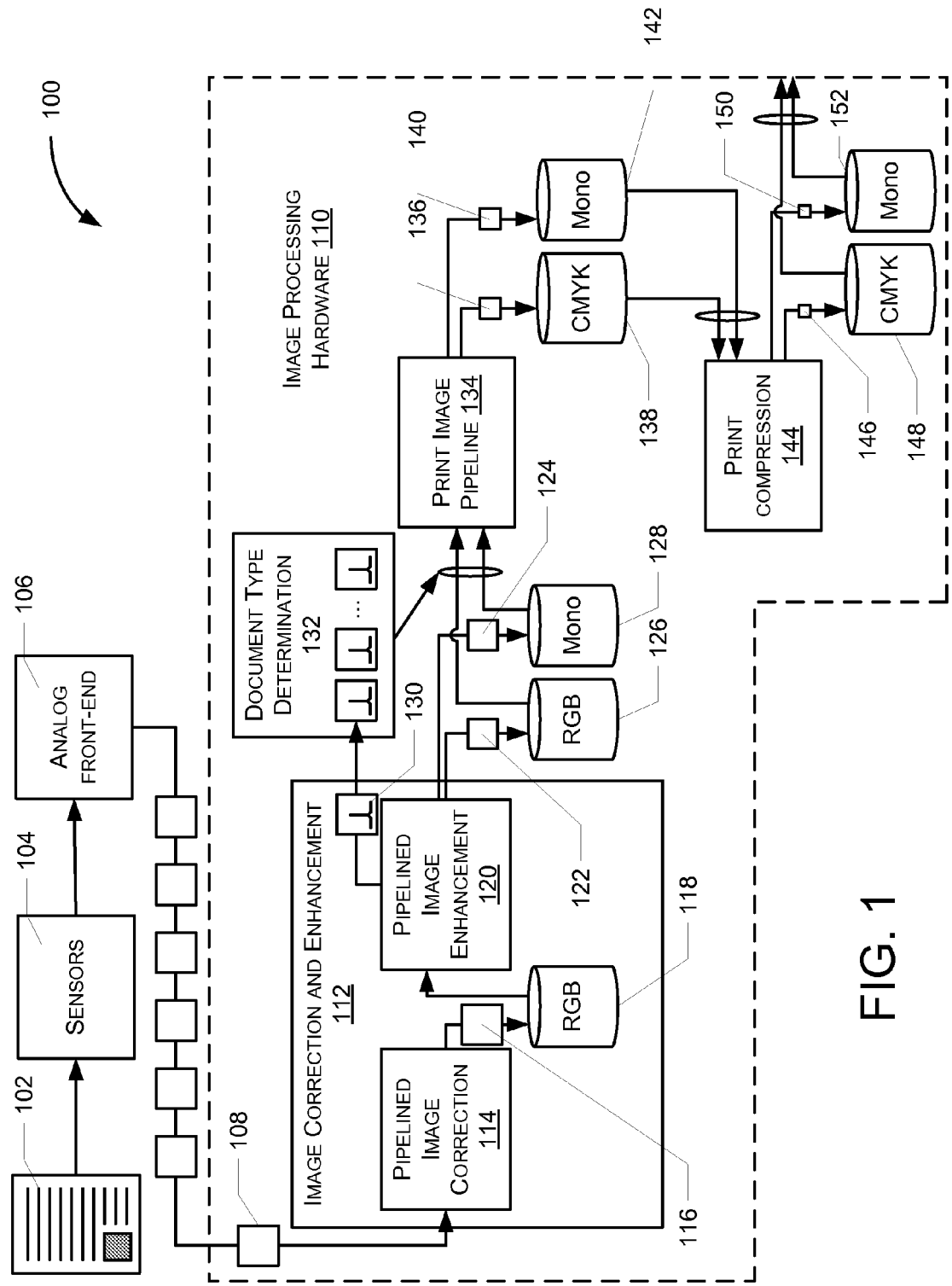
FIG. 1 schematically illustrates an image reproduction system configured to dual-process scanned documents in both color and monochrome.

FIG. 1 schematically illustrates an image reproduction system 100 configured to dual-process scanned documents in both color and monochrome. A document 102 (hereinafter referred to as a "scanned document") is color-scanned by sensors 104, which produce a plurality of color pixels (e.g., RGB color pixel data) and provide them to analog front end 106. The AFE 106 provides portions 108 of the color pixel data to image processing hardware 110. The portions 108 include, in various embodiments, horizontal, vertical, or diagonal rectangular-shaped slices or strips of pixels from the scanned document 102, such as those illustrated in FIG. 4 of the present disclosure. The scanned document 102 includes a physical document, such as for example an 8.5"×11" piece of paper, or other physical object. Although the scanned document 102 includes only a single page, a scanned document may include multiple pages without departing from the scope of this disclosure.

Image correction and enhancement 112 receives the portions 108, which undergo pipelined image correction (PIC) 114. Image correction includes, in various embodiments, one or more of shading correction (gain and offset correction on a per-pixel per-color basis), dead or hot pixel replacement, illumination issue resolution (shadow correction, slow frequency illumination intensity changes), magnification error corrections, and so forth. PIC 114 produces corrected image portions 116. Errors in the scanning process are sometimes introduced by imperfections in the sensors 104, strobes, or other components within the image reproduction system 100. PIC 114 corrects the portions 108 of the color pixel data. The corrected image portions 116, which include color pixels, are temporarily buffered in buffer 118.

The corrected image portions 116 buffered in the buffer 118 are provided to pipelined image enhancement (PIE) 120. PIE 120 performs dual processing of the color pixel data: both color enhancement and monochrome enhancement are performed, as will be discussed in more detail elsewhere within this disclosure. Image enhancements include, in various embodiments, one or more of conversion to monochrome (which may be based on Luminance as in black and white film cameras, or to display a wide range of colors that are easily distinguishable even if a black and white film camera would show them identically, or other monochrome conversion scheme), boosting an amount or intensity of colors, filtering (sharpening, smoothing or some combination thereof), lightening or darkening the overall image, scaling the image to some desired resolution, and so forth.

PIC 114 creates corrected image portions 116 as if the scanned document 102 had been scanned by ideal sensors, rather than real-world sensors 104. Thus, PIC 114 usually results in an objectively more accurate representation of the scanned document 102. PIE 120 performs image enhancement, such as image sharpening, which includes processing to make the image more pleasing to the human eye, which is thought of as a subjective improvement to the color pixel data, even if objectively less accurate. Image enhancement is performed in both color and monochrome, while image correction is performed only once on the raw color data to produce RGB (color) corrected image portions 116.

PIE 120 produces enhanced color portions 122 and enhanced monochrome portions 124. Once both enhanced color portions 122 and enhanced monochrome portions 124 are produced and buffered in buffers 126 and 128, individual ones of the corrected image portions 116 that correspond to the enhanced color portions 122 and to the enhanced monochrome portions 124 are discarded from the buffer 118. Thus, all of the raw image data (e.g., portions 108 and/or corrected image portions 116) for the scanned document 102 are not buffered while the dual processing and document type determination are performed. Instead, individual ones of the portions 108 and/or the corrected image portions 116 are buffered only until PIE 120 is performed on them individually. Image data produced by later processing steps are buffered for the whole scanned document 102 while the document type determination is made. As noted below, there is a trade-off between the amount of storage in the buffers 126/128, 138/140, and 148/152 and performance (e.g., the throughput or the size of hardware to process the image at a given rate). PIE 120 results in compressed data; in other words, the enhanced color portions 122 and the enhanced monochrome portions 124 are smaller than the corrected image portions 116. Storage capacity for buffering the outcome of the dual-processing performed by PIE 120 is therefore not as high as if the raw image data for the scanned document 102 were buffered in its entirety awaiting outcome of the document type determination. Further stages described below result in even greater compression.

PIE 120 also produces color distribution data portions 130 (e.g., histograms or other data such as standard deviations of the color distributions) that correspond to the individual ones of the corrected image portions 116. Document type determination 132 receives the color distribution data portions 130, and—based on the color distribution data portions 130—determines that the scanned document 102 is a color document or a monochrome document.

The scanned document 102 may be mostly monochrome with a small degree of color, such as in a text document. The document type determination 132 therefore uses, in some embodiments, color distribution data portions 130 associated with all portions 108 of the scanned document 102 to make the determination as to document type. For example, the scanned document 102 may include color only in a final portion 108 (corresponding for example to the bottom of the scanned document 102). If the document type determination 132 is performed on less than all of the color distribution data portions 130, color portions may be missed and monochrome processing may be selected for the scanned document 102 even though the scanned document 102 contains a non-negligible amount of color.

However, in some embodiments, only a subset of the color distribution data portions 130 are used to make the document type determination 132. In various examples, the first N color distribution data portions 130 are used, or a random selection of the color distribution data portions 130 may be utilized. In some embodiments, the document type determination 132 determines that the document is color based on only a single color distribution data portion indicating that the document is a color document. In some embodiments, the image processing hardware 110 performs color processing, and ceases performing monochrome processing, on a remainder of the scanned document 102 once the scanned document 102 is determined to be color. This may happen, for example, where a top or middle portion 108 of the scanned document 102 contains color sufficient to allow a determination that the scanned document 102 is a color document.

In some embodiments, the document type determination 132 determines that the scanned document 102 is a color document responsive to determining that at least one of the color distribution data portions 130 indicates that the scanned document 102 is color. In alternative embodiments, the document type determination 132 determines that the scanned document 102 is a color document responsive to a threshold percentage or number of the color distribution data portions 130 indicating that the scanned document 102 contains color. Other examples are possible without departing from the scope of embodiments.

In some embodiments, upon determining that the scanned document 102 is a color document, the document type determination 132 causes the enhanced color portions 122 to be retained in the image processing hardware 110 and the enhanced monochrome portions 124 and any other data in buffer 128 to be discarded. Upon determining that the scanned document 102 is a monochrome document, the document type determination 132 causes the enhanced monochrome portions 124 to be retained in the image processing hardware 110 and the enhanced color portions 122 and any other data in buffer 126 to be discarded. In addition, the document type determination 132 causes as appropriate either the enhanced color portions 122 or the enhanced monochrome portions 124 to be passed to further processing, such as by selecting one of the buffers 126 or 128 to pass their contents on to print image pipeline (PIP) 134. In the same or alternative embodiments, not illustrated in FIG. 1, the selected color or monochrome data is passed to other processing, such as a scan-to-host where the scanned document 102 is scanned for electronic storage rather than (or in addition to) printing.

PIP 134 processes enhanced color portions 122 for printing. PIP 134 produces color print data 136, which is stored as cyan, magenta, yellow, black (CMYK) data in buffer 138. PIP 134 also processes enhanced monochrome portions 124 for printing. PIP 134 produces monochrome print data 140 and stores it in buffer 142.

Further print processing is performed. The color print data 136 and/or the monochrome print data 140 are passed through print compression 144, which produces compressed print data, such as compressed color print data 146 stored in buffer 148 and compressed monochrome print data 150 stored in buffer 152. The print compression 144 utilizes, in various embodiments, Joint Bi-level Image Experts Group (JBIG) or JBIG2 compression to produce the compressed print data. Other compression may be used. The compressed print data is passed to printer hardware for printing.

As described above, in some embodiments the document type determination 132 selects either enhanced color portions 122 or enhanced monochrome portions 124 to be piped into the PIP 134 for print processing. Thus, in these embodiments, only one of color print data 136 or monochrome print data 140, and only one of compressed color print data 146 or compressed color monochrome data 150 is produced, depending on the data that is provided to it (color or monochrome data) and a determination as to whether the scanned document 102 is a color or monochrome document. In these embodiments, PIP 134 is a single pipeline. In alternative embodiments, the PIP 134 is a dual pipeline (or is configured for dual-pass) and produces both color print data 136 and monochrome print data 140. In some of these embodiments, both of the enhanced color portions 122 and the enhanced monochrome portions 124 are passed to PIP 134 and the document type determination 132 selects one of color print data 136 and monochrome print data 140 to be passed onto print compression 144 based on the color distribution data portions 130 for the scanned document 102. For example, where the document type determination 132 determines that the scanned document 102 is a color document, it causes the color print data 136 to be passed to the print compression 144. And where the document type determination 132 determines that the scanned document is a monochrome document, it causes the monochrome print data 140 to be passed to the print compression 144.

In still other embodiments, both color print data 136 and monochrome print data 140 are passed to print compression 144, and the document type determination 132 causes one of the compressed color print data 146 or the compressed monochrome print data 150 to be sent on to the printer hardware based on determining that the scanned document is a color or monochrome document. Thus, dual processing of the image data may proceed to various stages of the image processing hardware 110 in various embodiments of this disclosure.

Each stage of image processing within the image enhancement system 100 produces a further degree of image compression, which results in less data storage needs for the image processing hardware 110, since earlier processing steps may be individually discarded once downstream dual processing steps are performed on them, and thus are not kept until the document type is determined. For example, the corrected image portions 116 of the scanned document 102 are larger than the combination of the enhanced color portions 122 and the enhanced monochrome portions 124; these are larger respectively than the color print data 136 and the monochrome print data 140; and these are larger respectively than the compressed color print data 146 and the compressed monochrome print data 150. Thus, depending on the number of dual processing steps performed in the image enhancement system 100, the less buffering is used to store the resulting data.

The final dual processing data is buffered in its entirety until color distribution data portions 130 for each of the portions 108 of the scanned document 102 are produced and document type determination 132 is performed. Once the document type determination 132 is performed, the "false" data are discarded—in other words, no matter at what stage dual processing ends, the buffered color data is discarded where the scanned document 102 is determined to be monochrome, and the buffered monochrome data is discarded where the scanned document 102 is determined to be color. As noted above, color and monochrome data portions at earlier stages of dual processing are individually discarded once the later dual processing steps are completed on them individually, which may be prior to the document type determination.

Thus, there are two types of data discards that take place. In a first type of discard, the raw image data (e.g., portions 108) as well as any data from intermediate stages of dual processing (which may include in various embodiments, the corrected image portions 116, enhanced color portions 122, enhanced monochrome portions 124, color print data 136, monochrome print data 140, etc.) are individually discarded once downstream dual processing is individually performed on them and corresponding color and monochrome data are produced. In a second type of discard, all data from the final stage of dual processing, which may include in various embodiments, enhanced color portions 122, enhanced monochrome portions 124, color print data 136, monochrome print data 140, compressed color print data 146, and compressed monochrome print data 150) are discarded together once the document type determination 132 is performed; thus data from the final stage of dual processing is buffered together and the second type of data discard is performed on all color or monochrome portions associated with the scanned document 102 at the final stage of dual processing, rather than individually as with the first type of discard.

There is a trade-off between amount of storage in the buffers 126/128, 138/140, and 148/152 and performance of the system 100 (e.g., a tradeoff between the throughput and the size of hardware to process the image at a given rate). If the full image is buffered at buffers 126 and 128, then Pipelined image correction 134 and print compression 144 are run on only a single type of image (e.g., either color or mono). If instead a full page is buffered at 148 and 152, then a smaller amount of storage is needed (compared to buffering at 126 and 128), but PIP 134 and print compression 144 are run on both mono and color images, therefore potentially resulting in slower throughput.

Figure 2:
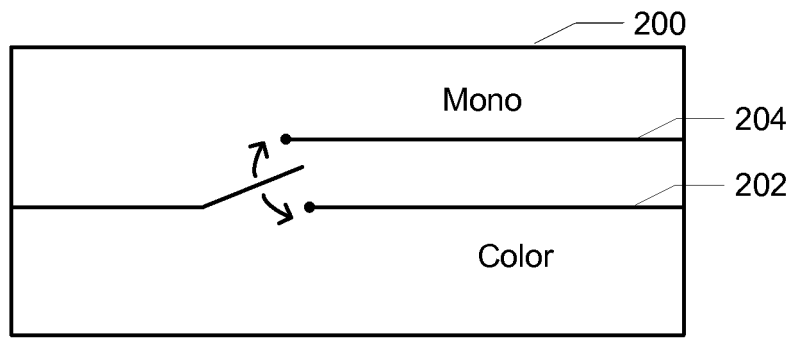
FIG. 2 schematically illustrates a dual-pass pipelined image enhancement (PIE) according to embodiments of the present disclosure.

FIG. 2 schematically illustrates a dual-pass pipelined image enhancement (PIE) 200 according to embodiments of the present disclosure. The PIE 200, which may be the same as or similar to the PIE 120 in FIG. 1, includes logic hardware for both a color path 202 and a monochrome path 204 for color and monochrome processing of color pixel data. On a first pass, one of the color path 202 or the monochrome path 204 is selected to perform enhancement on the color pixel data. On a second pass, the other one of the color path 202 or the monochrome path 204 is selected to perform enhancement on the color pixel data. Thus, the monochrome enhancement and the color enhancement are performed sequentially in embodiments such as those illustrated in FIG. 2.

Figure 3:
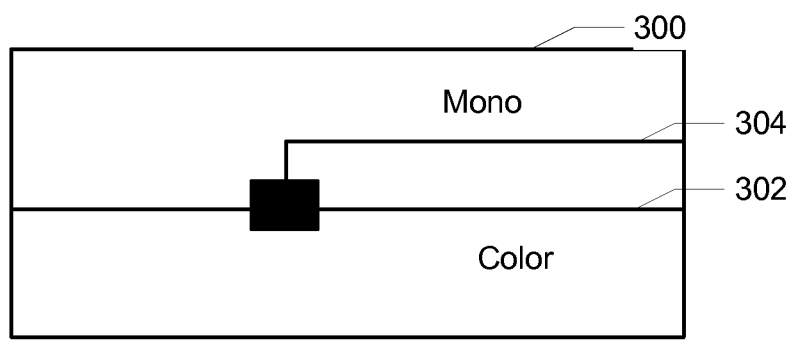
FIG. 3 schematically illustrates a parallel pipelined image enhancement (PIE) according to embodiments of the present disclosure.

FIG. 3 schematically illustrates a parallel pipelined image enhancement (PIE) 300 according to embodiments of the present disclosure. The PIE 300, which may be the same as or similar to the PIE 120 in FIG. 1, includes logic hardware for both a color path 302 and a monochrome path 304 for color and monochrome processing of color pixel data. The color pixel data, such as the corrected image portions 116 of the scanned document 102, are converted into colorspace data, such as the YCbCr colorspace, where the Y channel is a grayscale channel, the Cb is a blue-difference channel and the Cr is a red-difference channel. The monochrome channel data of the colorspace data (e.g., the Y channel) is copied to a monochrome path 304. Color processing is performed on a color path 302 using the monochrome channel data and the color channel data (e.g., the entirety of the YCbCr colorspace). The monochrome processing is performed by the parallel monochrome path 304 only on the monochrome channel data (e.g., the Y channel of the YCbCr colorspace).

Parallel processing, as in FIG. 3, and two-pass processing for color and monochrome, as in FIG. 2, have lower storage requirements than if the entire image were buffered awaiting document type determination. In a first example, an 8.5×11 scanned document is scanned at 300 dots per inch (dpi) and all of the raw image data are buffered while waiting on a determination as to whether the image is color or monochrome. Thus, an entire 48 bit-per-pixel (bpp) image is stored, which is approximately 200 Mbytes. It is read twice (once in monochrome and once in color) resulting in 500 Mbytes of data transfers (reads and writes combined).

In a second example, where a dual-pass sequential architecture, as in FIG. 2, is used for the same document only a single portion of the incoming data is buffered at a time. Both the processed monochrome image, at 8 bpp, and a processed color image, at 24 bpp, are stored, which totals approximately 135 Mbytes. The data for both processed images are read and output twice, once for color processing and once for monochrome processing, which results in about 535 Mbytes of total data transfers.

In a third example, where parallel processing hardware, as in FIG. 3, is used for the document, only a single portion of the incoming data is buffered at a time. Both the processed monochrome image, at 8 bpp, and a processed color image, at 24 bpp, are stored, which totals about 135 Mbytes. Unlike with the second example, however, the data for both processed images are read and written only once, resulting in approximately 335 Mbytes of data transfers.

From these examples, the architecture in FIG. 2 utilizes less storage than if the entire image were buffered (as in example 1), while the parallel architecture of FIG. 3 both utilizes less storage and results in less data transfer than if the entire image were buffered. Further data storage and data transfer savings are realized if dual processing proceeds further as described above with respect to FIG. 1.

Figure 4:
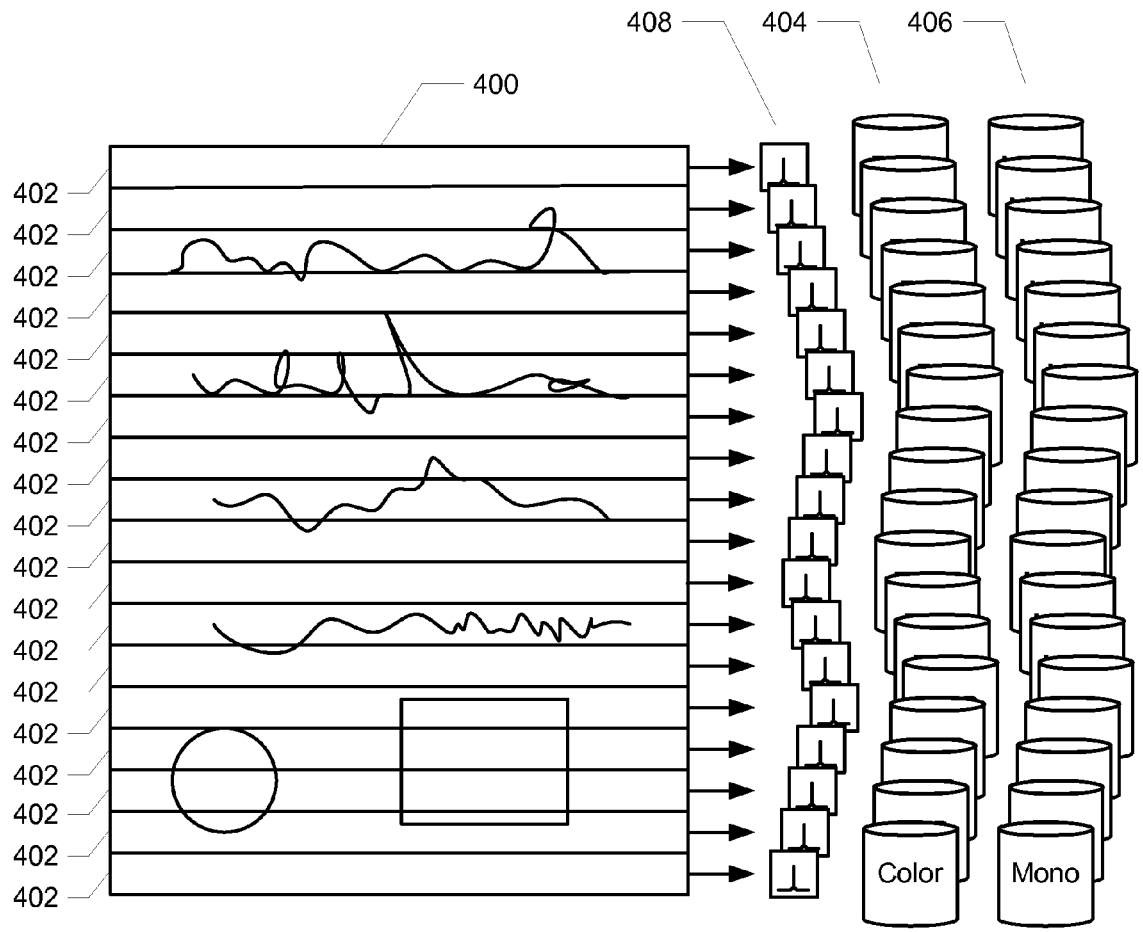
FIG. 4 illustrates a scanned document on which dual processing in both color and monochrome is performed.

FIG. 4 illustrates a scanned document 400 on which dual processing in both color and monochrome is performed. The scanned document 400, which may be the same as or similar to the scanned document 102, is shown with horizontal portions 402. The horizontal portions 402 are, in various embodiments, one to two inch strips of the scanned document 400, although other sized portions may be used. As the scanned document 400 is scanned, subsets of color pixel data associated with each of the horizontal portions 402 are dual processed to produce both color image data 404 and monochrome image data 406. For example, as described above with respect to FIG. 1, the color image data 404 includes, in various embodiments, one of enhanced color portions 122, color print data 136, or compressed color print data 146. Monochrome image data 406 includes one of enhanced monochrome portions 124, monochrome print data 140, or compressed monochrome print data 150. All of the color image data 404 and the monochrome image data 406 are buffered until a determination is made that the scanned document 400 is a color document or a monochrome document. That determination is made based on color distribution data portions 408 produced for each of the horizontal portions 402. Thus, the determination is made, in some embodiments, after all of the color distribution data portions 408 are available as is described elsewhere within this disclosure. As described elsewhere within this disclosure, color and monochrome data from earlier processing steps, including the raw pixel data, is discarded prior to determining that the scanned document 400 is a color or monochrome document.

Figure 5:
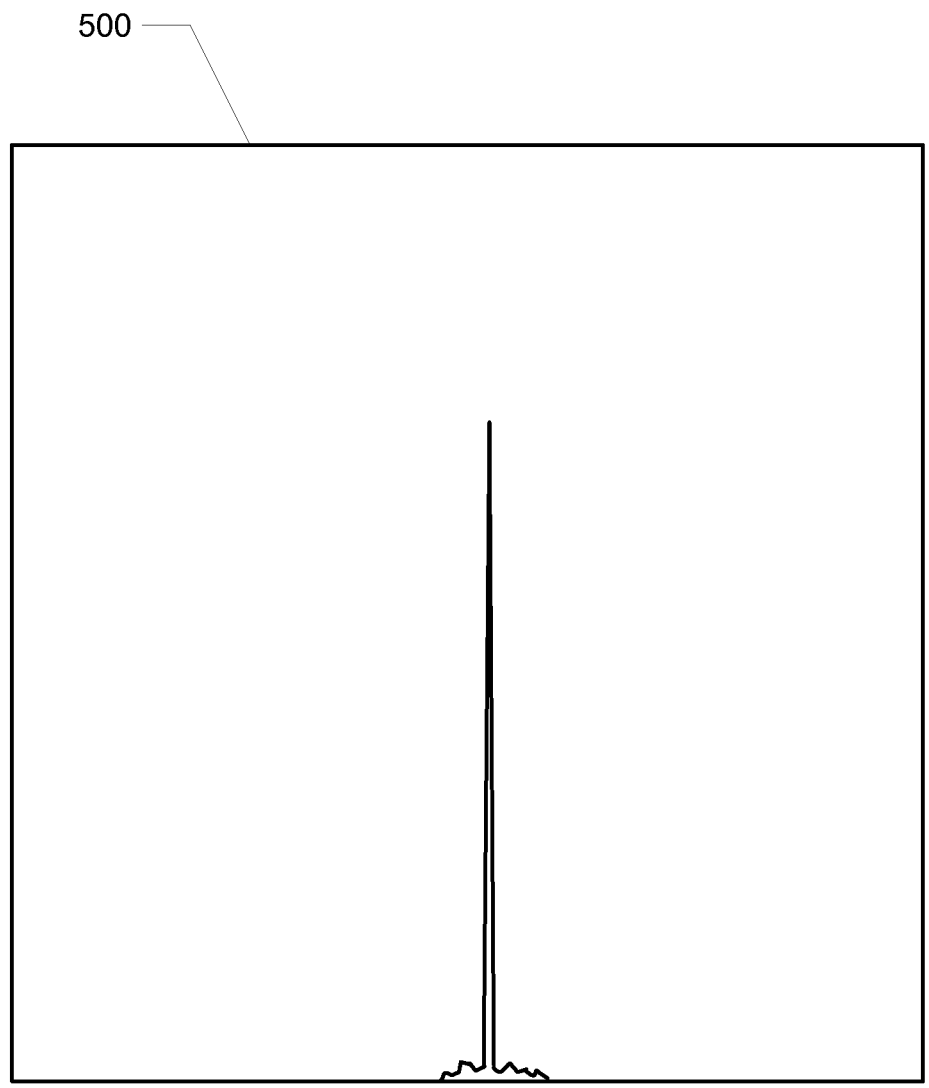
FIGS. 5 and 6 illustrate one-dimensional color histograms for exemplary color and monochrome scanned documents, respectively.
Figure 6:
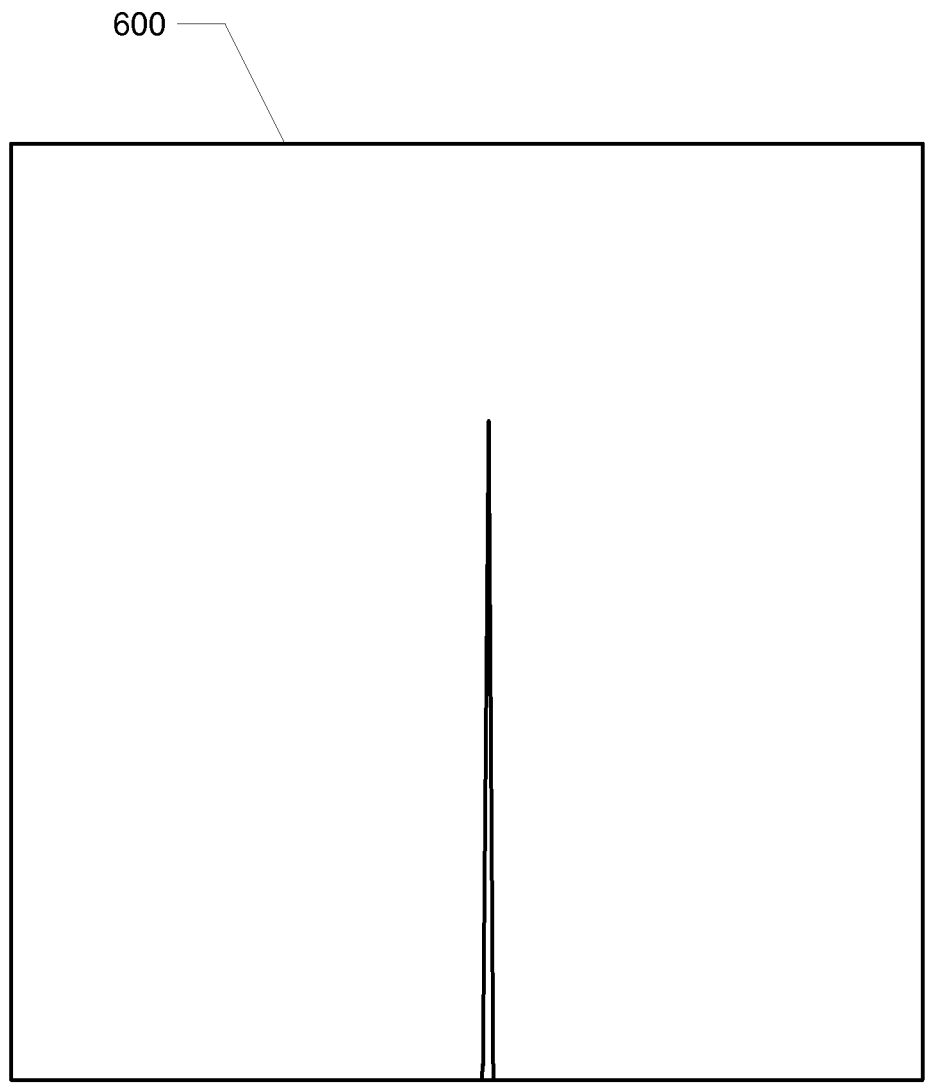

FIGS. 5 and 6 illustrate one-dimensional color histograms 500 and 600 for exemplary color and monochrome scanned documents, respectively. The color histograms 500 and 600 represent color distribution portions, such as the color distribution data portions 130 of FIG. 1, or they may represent composite histograms that result from all color distribution portions for a scanned document. Both color histograms 500 and 600 include large peaks at the mode, which accounts for the fact that both color and monochrome documents are frequently largely white, such as where the color and monochrome documents both contain a large amount of printed text (black or other color ink printed on a white substrate). Color histogram 500 includes a wider distribution of color around its mode than color histogram 600. In some embodiments, the standard deviations of the color distributions are used to determine that the scanned document is a color or a monochrome document. In embodiments, a predetermined value— which may be tunable to a particular scanner or copier—is compared to one or more standard deviation values of the color distribution data portions (such as the color distribution data portions 130 of FIG. 1) to determine whether the scanned document is a color or monochrome document. As discussed elsewhere within this disclosure, in some embodiments, as long as at least one of the color distribution data portions 130 has a standard deviation that exceeds the tunable threshold value, the scanned document is determined to be a color document. In some embodiments, instead of separate one-dimensional histograms of Cb and Cr, two-dimensional histograms of CbCr are used. Such histograms allow a determination of the color distribution of the image.

In some embodiments, the color distribution data represents YCbCr colorspace distributions, so that both a Cb histogram and a Cr histogram are produced (or a combination CbCr histogram). In one example, the Cb standard deviation of a portion of a scanned document having color is 5.06633 and the Cr standard deviation of the portion is 7.74447. In contrast, the Cb and Cr standard deviations of a monochrome portion of a scanned document are 0.422098 and 1.21972, respectively. Thus, in this example, a threshold value set somewhere between these values may be used to differentiate between a monochrome and a color document.

Figure 7:
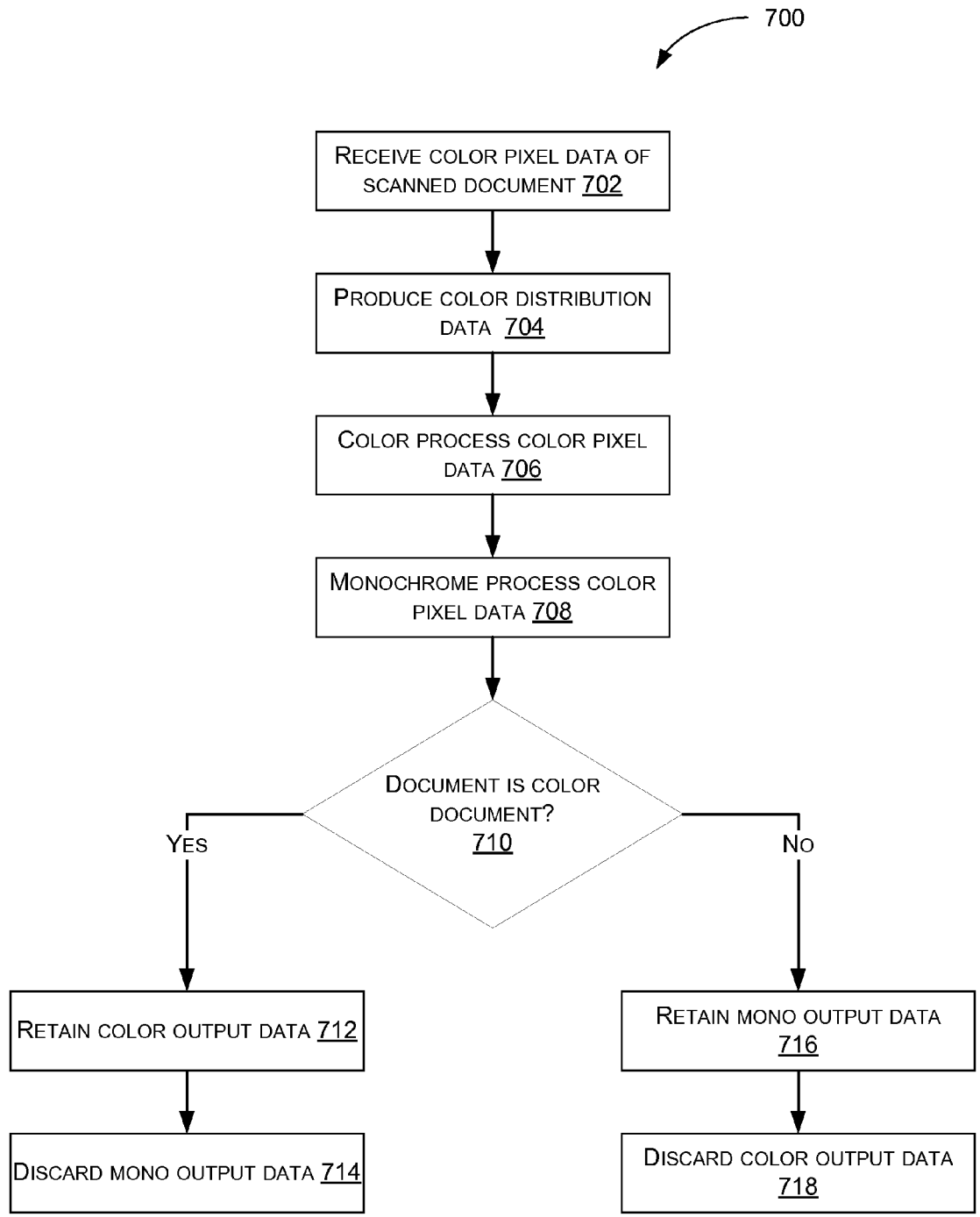
FIG. 7 is a flow diagram of a method to process an image based on determining that a document is a color or monochrome document, in accordance with various embodiments.

FIG. 7 is a flow diagram of a method 700 to process an image based on determining that a document is a color or monochrome document, in accordance with various embodiments. At 702, an image processing hardware receives color pixel data of a scanned document. The document is scanned in color, so that it can be processed in both color and monochrome.

At 704, the image processing hardware produces color distribution data from the color pixel data. The color pixel data may be color distributions for each channel of a plurality of color channels. In some embodiments, the color pixel data is, or is transformed into, YCbCr colorspace, and color distribution data (e.g., histograms) are produced for both the Cb channel and the Cr channel. The color distribution data includes, in some embodiments, statistical values associated with the color distribution data such as a standard deviation value, or other measure.

At 706, the image processing hardware color processes the color pixel data to produce color output data. Color processing the color pixel data includes, in some embodiments, running the color pixel data through a Pipelined Image Enhancement (PIE) to produce enhanced color image data. In the same or different embodiments, color processing the color pixel data includes running the pixel data through print processing to produce color print data as the color output data. The color print data may include CMYK data. The color print data may include compressed print data, such as JBIG data.

At 708, the image processing hardware monochrome process the color pixel data to produce monochrome output data. Monochrome processing the color pixel data includes, in some embodiments, running the color pixel data through a Pipelined Image Enhancement (PIE) to produce enhanced monochrome image data. In the same or different embodiments, monochrome processing the color pixel data includes running the pixel data through print processing to produce monochrome print data as the monochrome output data. The monochrome print data may include CMYK data. The monochrome print data may include compressed print data, such as JBIG data. As noted above, the color processing at 706 and the monochrome processing at 708 are in some embodiments performed sequentially, while in other embodiments they are performed in parallel.

At 710, the image processing hardware determines, subsequent to the color processing and the monochrome processing, that the scanned document is either a monochrome document or a color document. The determination is based at least on the color distribution data for the scanned document. In some embodiments, standard deviation values from color distribution data are compared to a tunable threshold value to determine whether the scanned document is color or monochrome.

At 712, upon determining that the scanned document is a color document, the color output data is retained, to be passed on to downstream processing. At 714, the monochrome output data is discarded.

At 716, upon determining that the scanned document is a monochrome document, the monochrome output data is retained, to be passed on to downstream processing. At 718, the color output data is discarded. In some embodiments, 702-708 are performed on less than the entire scanned document prior to making a decision at 710 regarding whether the scanned document is a monochrome or color document and discarding the data at 714 or 718. Thus, at least a portion of the data can be discarded prior to processing the entire scanned image in both color and monochrome.

Figure 8:
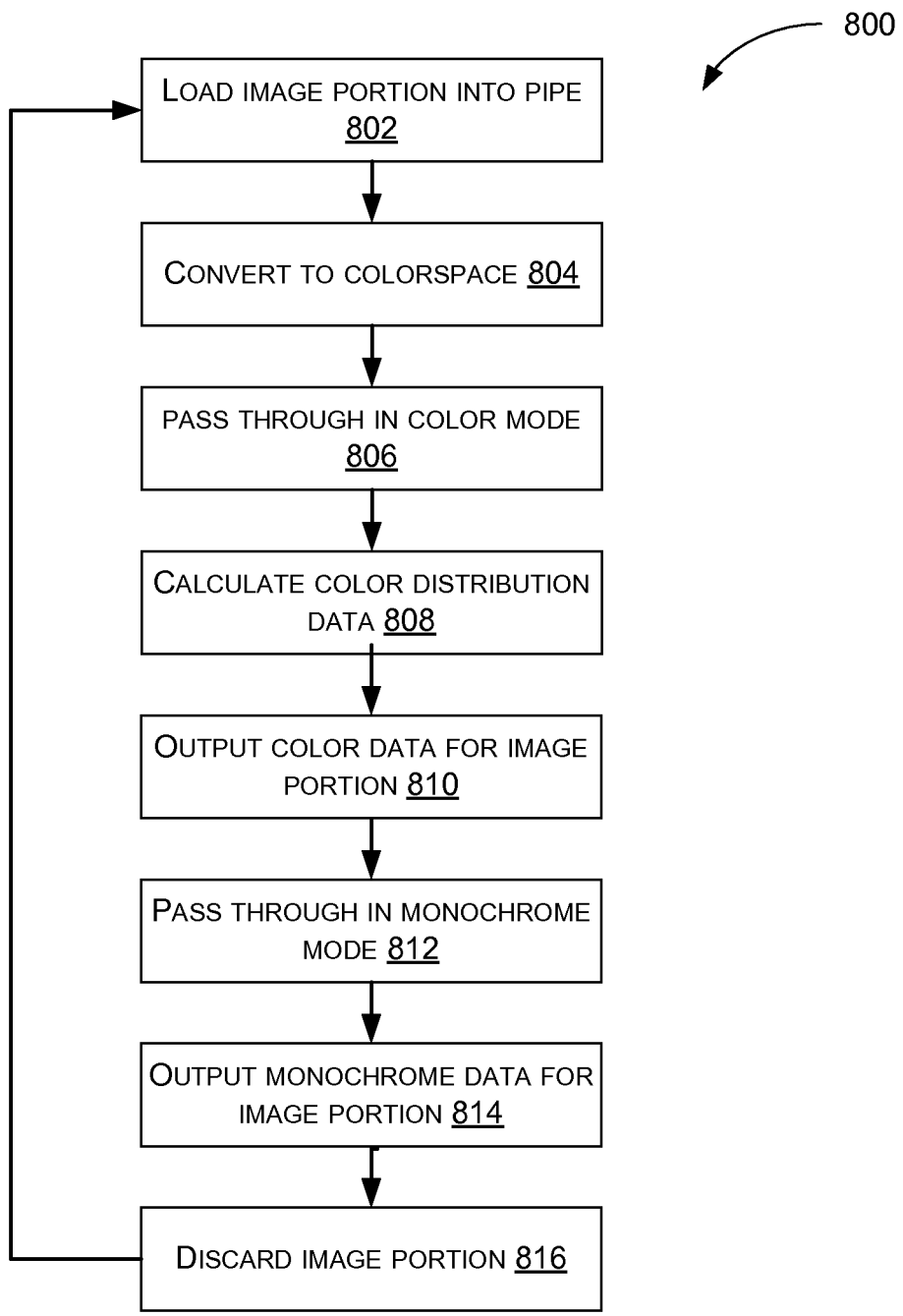
FIG. 8 is a flow diagram of a method to sequentially process portions of an image in both monochrome and in color, in accordance with various embodiments.

FIG. 8 is a flow diagram of a method 800 to sequentially process portions of an image in both monochrome and in color, in accordance with various embodiments. At 802, an image portion is loaded into an image pipe of an image processing hardware. The image portion may include, for example, different segments of the scanned image, such as horizontal, vertical, or diagonal strips of pixels of the scanned document. Because a document is often scanned using sensors that are moved across the length of a document, such horizontal strips of pixels are usually received by the image processing hardware in a sequential order; such portions are in some embodiments sequentially processed in the order received. However, embodiments are not limited to sequentially processing horizontal portions of scanned documents. The image portion includes color pixel data (e.g., RGB data) of the scanned document.

At 804, the color pixel data of the image portion is converted into colorspace data, such as YCbCr data. At 806, the colorspace data is passed through an image processing process or pipe in a color mode. Such color processing may include one or more of a Pipelined Image Enhancement, a Print Image Pipeline, print compression, and so forth.

At 808, color distribution data is calculated, as described elsewhere within this Detailed Description. At 810, the color data for the image portion is output and buffered.

At 812, the, at least some of the colorspace data (i.e., the Y channel of the YCbCr colorspace) is passed through an image processing process or pipe in a monochrome mode. Such monochrome processing may include one or more of a Pipelined Image Enhancement, a Print Image Pipeline, print compression, and so forth.

At 814, monochrome data for the image portion is output and buffered. At 816, data associated with the image portion at an earlier stage of image processing, including the raw image data, is discarded thereby reducing the storage needs of the image processing hardware. The process repeats for all portions of the scanned document, which are received sequentially. Although FIG. 8 shows 804-808 as occurring earlier than 812, these actions are performed in reverse order or are performed concurrently in various embodiments.

Figure 9:
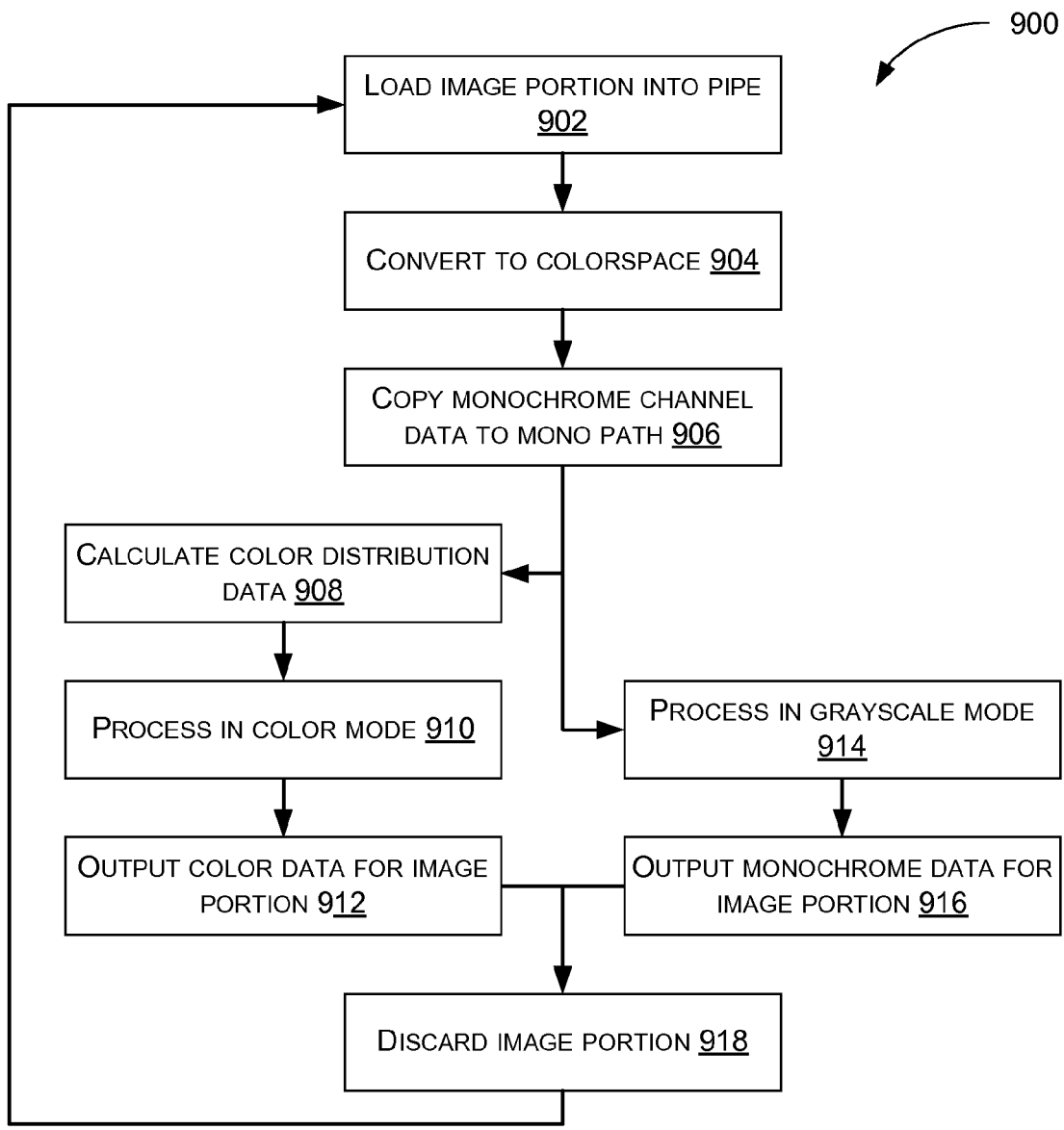
FIG. 9 is a flow diagram of a method to process portions of an image for both monochrome and color in parallel, in accordance with various embodiments.

FIG. 9 is a flow diagram of a method 900 to process portions of an image for both monochrome and color in parallel, in accordance with various embodiments. At 902, an image portion is loaded into an image pipe of an image processing hardware. The image portion may include, for example, different segments of the scanned image, such as horizontal strips of pixels of the scanned document, or other portions of the scanned image.

At 904, the color pixel data of the image portion is converted into colorspace data, such as YCbCr data. At 906, the monochrome channel of the colorspace data is copied to a parallel monochrome path of the image pipe.

At 908, color distribution data is calculated for the image portion, as described elsewhere within this Detailed Description. At 910, the colorspace data is color processed through a parallel color path of the image pipe. Such color processing may include one or more of a Pipelined Image Enhancement, a Print Image Pipeline, print compression, and so forth. At 912, color output data is output and buffered.

At 914, the monochrome channel of the colorspace for the image portion is passed through the monochrome path. Such monochrome processing may include one or more of a Pipelined Image Enhancement, a Print Image Pipeline, print compression, and so forth.

At 916, monochrome data for the image portion is output and buffered. At 918, data associated with the image portion at an earlier stage of image processing, including the raw image data, is discarded thereby reducing the storage needs of the image processing hardware. The process repeats for all portions of the scanned document, which are received sequentially.

The description may use the phrases "in an embodiment," or "in embodiments," which may each refer to one or more of the same or different embodiments. The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B." The phrase "at least one of A, B and C" means (A), (B), (C), (A and B), (A and C), (B and C) or (A, B and C). The phrase "(A) B" means (B) or (A and B), that is, A is optional.

Although certain embodiments have been illustrated and described herein, a wide variety of alternate and/or equivalent embodiments or implementations calculated to achieve the same purposes may be substituted for the embodiments illustrated and described without departing from the scope of the present invention. This application is intended to cover any adaptations or variations of the embodiments discussed herein. Therefore, it is manifestly intended that embodiments in accordance with the present invention be limited only by the claims and the equivalents thereof.

What is claimed is:

1. An image reproduction system comprising:
   image processing hardware, wherein the image processing hardware is configured to
      receive a plurality of pixels corresponding to a scan document,
      perform color processing on the plurality of pixels to produce color-processed scan data,
      perform monochrome processing on the plurality of pixels to produce monochrome-processed scan data,
      produce color distribution data for the plurality of pixels,
      determine from the color distribution data that the scan document is one of (i) a color document or (ii) a monochrome document,
      based at least on determining that the scan document is a color document, discard the monochrome-processed scan data, and
      based at least on determining that the scan document is a monochrome document, discard the color-processed scan data.

2. The image reproduction system of claim 1, wherein the image processing hardware is further configured to:
   separately perform the color processing on at least a particular subset of the plurality of pixels;
   separately perform the monochrome processing on at least the particular subset of the plurality of pixels; and
   discard at least the particular subset of the plurality of pixels (a) prior to the determining that the scan document is one of (i) a color document or (ii) a monochrome document, and (b) subsequent to the separate performance of
      the color processing on the particular subset of the plurality of pixels, and
      the monochrome processing on the particular subset of the plurality of pixels.

3. The image reproduction system of claim 1, wherein the image processing hardware is further configured to:
   separately produce color distribution data for individual subsets of the plurality of pixels; and
   make the determination whether the scan document is one of (i) a color document or (ii) a monochrome document based on the separately produced color distribution data for more than one of the individual subsets of the plurality of pixels of the scan document.

4. The image reproduction system of claim 3, wherein the individual subsets of the plurality of pixels are captured from horizontal strips of the scan document.

5. The image reproduction system of claim 1, wherein the color distribution data includes histogram data in YCbCr colorspace.

6. The image reproduction system of claim 1, wherein:
   the processing hardware includes an image pipe; and
   the processing hardware is configured to pass subsets of the plurality of pixels twice through the image pipe, including (i) a first pass to perform the color processing and (ii) a second pass to perform the monochrome processing.

7. The image reproduction system of claim 1, wherein the image processing hardware is further configured to:
   convert the plurality of pixels into colorspace data,
   perform the color processing on the colorspace data in a first path,
   copy a monochrome channel of the colorspace data into a second path, and
   perform the monochrome processing on the monochrome channel in the second path.

8. The image reproduction system of claim 1, wherein the image processing hardware is further configured to determine that the scan document is one of (i) a color document or (ii) a monochrome document based at least on a standard deviation value of the color distribution data.

9. The image reproduction system of claim 1, wherein the image processing hardware is further configured to determine that the scan document is one of (i) a color document or (ii) a monochrome document based at least on a comparison of at least one standard deviation value of the color distribution data to a tunable value.

10. The image reproduction system of claim 1, wherein the image processing hardware is further configured to pass, to print processing, a retained one of the one of (i) the color-processed scan data or (ii) the monochrome-processed scan data.

11. A method of automatically selecting a scan mode for a scanned document, the method comprising:
    receiving color pixel data of the scanned document;
    producing color distribution data from the color pixel data;
    color processing the color pixel data to produce color output data;
    monochrome processing the color pixel data to produce monochrome output data;
    determining, subsequent to (i) the color processing and (ii) the monochrome processing that the scanned document is a monochrome document, wherein the determining is based at least on the color distribution data; and
    responsive to the determining that the document is a monochrome document, discarding the color output data and passing the monochrome output data to downstream processing.

12. The method of claim 11, wherein:

the color processing includes sequentially color processing subsets of the color pixel data to produce corresponding portions of the color output data;

the monochrome processing includes sequentially monochrome processing the subsets of the color pixel data to produce corresponding portions of the monochrome output data; and the method further comprises discarding individual ones of the subsets of the color pixel data, wherein the discarding is (i) subsequent to (a) the sequentially color processing of the individual ones of the subsets of the color pixel data and (b) the sequentially monochrome processing of the individual ones of the portions of the color pixel data, and (ii) prior to the determining that the scanned document is a monochrome.

13. The method of claim 12, further comprising sequentially processing the subsets of the color pixel data to determine corresponding portions of the color distribution data, wherein the determining that the scanned document is one of a monochrome document is further based at least on all of the corresponding portions of the color distribution data for the scanned document.

14. The method of claim 12, wherein the subsets of the color pixel data are captured from horizontal strips of the scanned document.

15. The method of claim 11, wherein the color pixel data includes RGB data, and the color distribution data includes histogram data in YCbCr colorspace.

16. The method of claim 11, wherein:

the color processing includes passing at least a first subset of the color pixel data through an image pipe of image processing hardware to produce the color output data; and the monochrome processing includes passing at least the first subset of the color pixel data through the image pipe of the image processing hardware to produce the monochrome output data, wherein (i) the color processing of the first subset of the color pixel data and (ii) the monochrome processing of the first subset of the color pixel data occurs sequentially.

17. The method of claim 11, further comprising converting a subset of the color pixel data into (i) monochrome channel data and (ii) color channel data, wherein:

the color processing is performed on (i) the monochrome channel data and (ii) the color channel data;

the monochrome processing (i) is performed on the monochrome channel data, (ii) is performed in parallel with the color processing of (a) the monochrome channel data and (b) the color channel data, and (iii) excludes the color channel data.

18. The method of claim 11, wherein the determining that the scanned document is a monochrome is further based on standard deviations of the color distribution data.

19. The method of claim 11, wherein the determining that the scanned document is a monochrome document includes comparing at least (i) a standard deviation value of the color distribution data to (ii) a tunable value.

20. The method of claim 11, wherein the downstream processing includes print processing.

* * * * *